United States Patent [19]

La Belle

[11] Patent Number: 5,375,460
[45] Date of Patent: Dec. 27, 1994

[54] METHOD AND APPARATUS FOR TESTING MOTOR VEHICLES UNDER SIMULATED ROAD CONDITIONS

[75] Inventor: John T. La Belle, Long Beach, Calif.

[73] Assignee: Clayton Industries, El Monte, Calif.

[21] Appl. No.: 45,640

[22] Filed: Apr. 9, 1993

[51] Int. Cl.$^5$ .................................... G01L 3/22
[52] U.S. Cl. .................................... 73/117
[58] Field of Search ............. 73/117, 123, 125, 865, 73/862.18, 862.29

[56] References Cited

U.S. PATENT DOCUMENTS 4,161,116 7/1979 Fegraus et al.
5,101,660 4/1992 La Belle.

OTHER PUBLICATIONS

ASE Technical Paper Series, *Advantages of Using Microcomputers in Dynamometer Controllers* Severiono D'Angelo and R. D. Gafford; Feb. 1981; pp. 1-11.

Primary Examiner—Robert Raevis
Attorney, Agent, or Firm—Harold L. Jackson

[57] ABSTRACT

A chassis dynamometer apparatus and method for testing motor vehicles includes at least one roll for engaging the driven wheels of the vehicle. A power supplying and/or absorbing unit such as an electric motor supplies and/or absorbs power from the roll. In addition, a force transducer and speed sensor are coupled to the roll for providing force and speed signals. Signals representative of the desired vehicle inertia, the road load to be simulated, the forces attributable to the parasitic losses and the out-of-loop inertia of the dynamometer and vehicle are also provided. A system controller in response to the above signals controls the power supplying and/or absorbing unit in accordance with:

$$Vd = \int_0^t \frac{Fm + PL + IoAs - RL}{Iv} dt$$

where:
- Vd = the desired roll velocity;
- Fm = the measured force signal associated with the roll;
- PL = the dynamometer parasitic loss signal;
- RL = the road load signal;
- Io = The out-of-loop inertia of the dynamometer and vehicle;
- Ac = the roll acceleration signal;
- Iv = the vehicle inertia signal; and
- dt = the interval of integration.

21 Claims, 3 Drawing Sheets

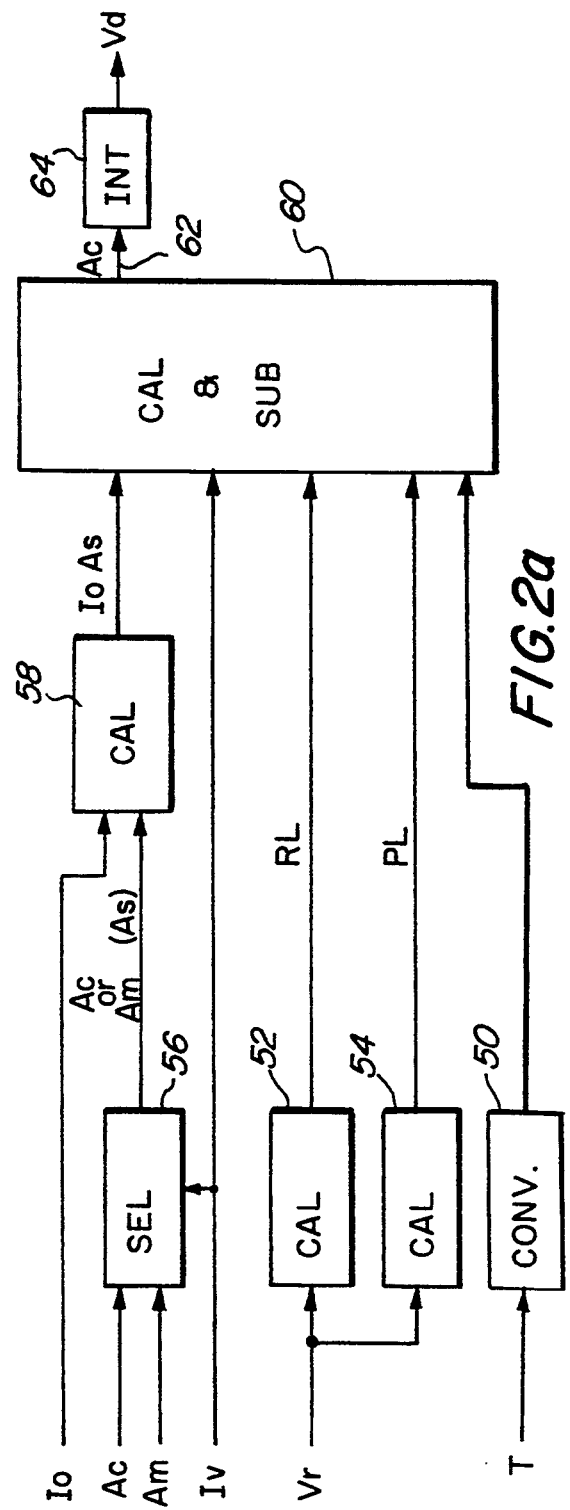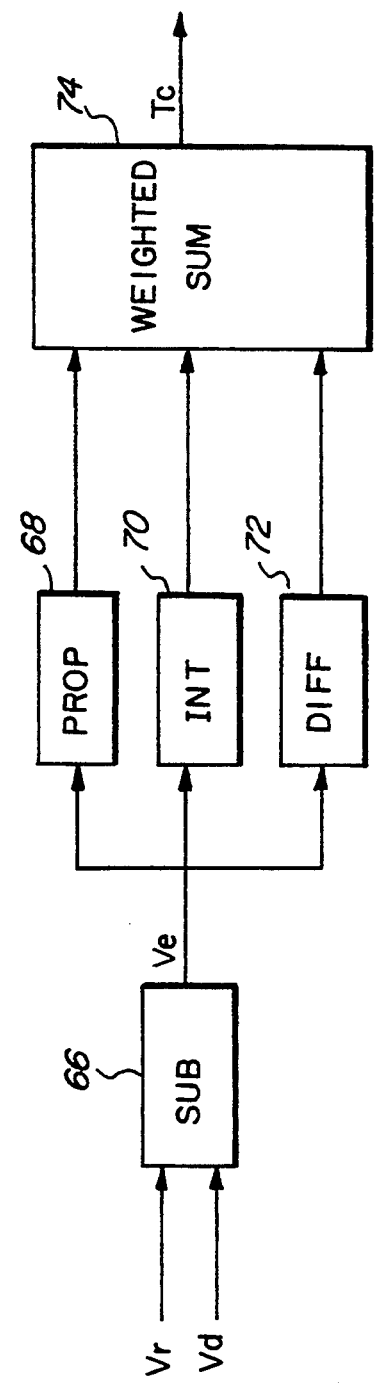

METHOD AND APPARATUS FOR TESTING MOTOR VEHICLES UNDER SIMULATED ROAD CONDITIONS

BACKGROUND OF THE INVENTION

1. Field of the Invention

This invention relates to an apparatus and method for testing motor vehicles under anticipated road conditions.

2. Description of the Prior Art

Test apparatus in the form of dynamometers is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = Av + BvV + CvV^2 + DW$$

where $Av$ represents the vehicle constant load coefficient (e.g., effects of breakaway force), and, $Bv$ and $Cv$ represents the vehicle load coefficient dependent on velocity and velocity squared (e.g., windage), and $D$ represents the grade coefficient (e.g., slope of the grade). It should be noted that a load coefficient based on velocity cubed may be added if desired. $V$ represents the vehicle velocity and $W$ represents the vehicle weight.

The purpose of the dynamometer is to impose those forces on the vehicle which the vehicle would incur during actual operation on a road. Chassis dynamometers for 2WD vehicles (front or rear axle drive) include a roll (or a pair of rolls) for engaging the driven wheels of the vehicle being tested. Chassis dynamometers for 4WD vehicles (front and rear axles coupled to the engine) include a roll or pair of rolls for supporting and engaging each pair of wheels (front and rear) with each pair of rolls being free to rotate independently and at different speeds or electrically (or mechanically) coupled so that all of the rolls rotate at the same speed. See U.S. Pat. No. 5,101,660 assigned to the assignee of this application.

Typically a power supplying and absorbing unit such as an electric motor (a.c. or d.c.) or a power absorbing unit such as a friction brake, eddy current brake or hydrokinetic brake is coupled to the roll or rolls for supplying power to and/or absorbing power from the roll(s) which in turn applies a force to the surface of the vehicle wheels (e.g., tires) to simulate the road load forces. Inertial forces can be simulated by power supplying and absorbing units during both acceleration and deceleration but can be simulated by power absorbing units only during acceleration. Mechanical flywheels are generally used in conjunction with power supplying and/or absorbing units to simulate a part (or in some instances substantially all) of the vehicle inertia. Vehicle velocity may be determined from the formula:

$$V_1 - V_0 = \int_{t_0}^{t_1} \frac{F - RL}{I} dt$$

where $V_1$ = the computed velocity at time $t_1$, $V_0$ = the velocity at time $t_0$, $F$ = the measured force at the wheel/roll interface, $I$ = the vehicle inertia to be simulated (e.g., vehicle weight in lb or Kg) and $RL$ = the road load force and $dt$ = the interval of integration. The implementation of this basic equation to control the operation of a dynamometer is explained in some detail in U.S. Pat. No. 4,161,116 also assigned to the assignee of this application.

The rotational velocity of the roll is representative of $V$ and can be accurately measured by coupling a speed encoder of the optical or magnetic pulse type to the dynamometer roll. However, there is no force measuring device which, as a practical matter, can be placed between the rotating vehicle wheel and the roll. As a compromise, a force measuring device or transducer is generally placed either at the output of the power supplying and/or absorbing unit or between the flywheel assembly and the shaft connecting the flywheels to the roll. In either case, there are bearing friction and windage losses generated by the roll and/or flywheels which are not measured by the transducer. Such losses are commonly referred to as parasitic losses and must be compensated for in order to provide an accurate control signal for the power supplying and/or absorbing unit in the dynamometer.

A parasitic loss profile or curve of the lost force at the roll surface (due to parasitic losses) versus roll speed for the roll can be computed by measuring the force required to maintain the roll or rolls at several selected (e.g., four or more) speeds. A signal representative of the forces attributable to parasitic losses and the dynamometer out-of-loop inertia must then be added to the force signal measured by the transducer to provide a force signal representative of F.

The use of the above algorithm (implemented with the dynamometer parasitic losses and out-of-loop inertia) for controlling the power supplying and/or absorbing unit is compromised by the forces attributable to the inertia of the out-of-loop rotational mass of the vehicle such as the wheels, drive train etc. While the rotational mass of such components is generally small (e.g., equivalent to 50 to 70 or more Kg) compared to the weight of the vehicle (e.g., 500 to 2500 Kg) the resulting inaccuracy in the road condition test results may prove to be very expensive to a manufacturer which is required to meet maximum fuel performance requirements (as set, for example, by the U.S. Environmental Protection Agency ["EPA"]) for its vehicles.

An EPA advisory circular (A/C No. 55c dated Dec. 12, 1986) suggests that the rotational mass of the vehicle may be set at a value up to 3% of the vehicle inertia (i.e., vehicle weight) where the vehicle rotational mass is not known. This figure may be added to either the out-of-loop inertial mass of the dynamometer or to the mass of the vehicle. While such a rough approach will provide better test results than neglecting the vehicle rotational mass altogether, it does not account for the variations in rotational mass among the vehicles to be tested. For example, 4WD vehicles may have higher percentages of rotational mass than 2WD vehicles.

There is a need for a versatile chassis dynamometer apparatus and method for more accurately testing motor vehicles under simulated road conditions.

SUMMARY OF THE INVENTION

In accordance with the present invention a chassis dynamometer apparatus for testing motor vehicles under simulated road conditions includes at least one roll for engaging the driven wheels of the vehicle. A power supplying and/or absorbing unit, such as an electric motor is coupled to the roll or rolls. Force sensing means is coupled to the roll to provide a force signal representative of the force supplied to or received from the vehicle wheels by the roll minus the forces attributable to the dynamometer parasitic losses and the forces attributed to the rotational components of the dynamometer outside of the control loop ("out-of-loop").

Velocity sensing means is coupled to the roll for providing a signal representative of the speed of the roll. The apparatus further includes inertia and road load signal generators for providing signals which represent the simulated inertia and road load forces of the vehicle being tested. Means are also provided for generating parasitic loss signals which represent the forces attributable to the parasitic losses of the dynamometer. In addition, means are provided for generating a signal representative of the forces attributable to the out-of-loop rotational components of the dynamometer and the vehicle.

A system controller responsive to the above signals controls the power supplying and/or absorbing unit in accordance with the following equation:

$$Vd = \int_o^t \frac{Fm + PL + IoAs - RL}{Iv} dt$$

where:
- Vd = the desired velocity of the driven roll or rolls;
- Fm = the measured force signal associated with the driven roll or rolls;
- PL = the parasitic loss signal associated with the dynamometer;
- Io = Iod (out-of-loop inertia of the dynamometer) plus Iov (out-of-loop inertia of the vehicle);
- RL = the road load signal;
- As = the acceleration signal (calculated or measured);
- dt = the interval of integration; and
- Iv = the simulated vehicle inertia signal.

The features of the present invention can be best understood by reference to the following drawings taken in conjunction with the accompanying description wherein like reference numerals indicate like components.

BRIEF DESCRIPTION OF THE DRAWINGS

FIGS. 2a and 2b are block diagrams of the signal flow for deriving the desired velocity for the driven roll and the torque command for the power supplying and/or absorbing unit.

DESCRIPTION OF THE PREFERRED EMBODIMENT

Figure 1:
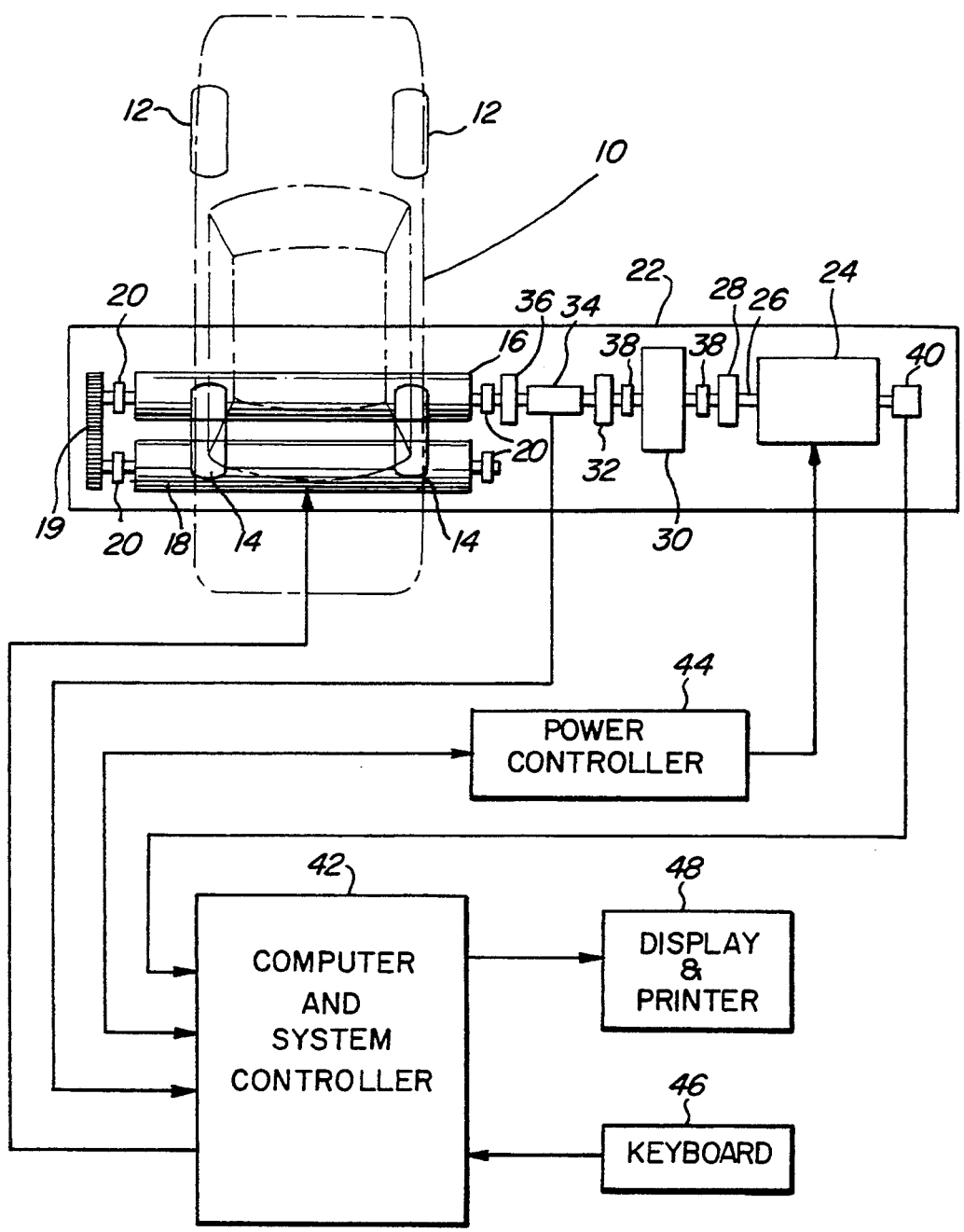
FIG. 1 is a diagrammatic plan view of a chassis dynamometer apparatus in accordance with the present invention.

Referring now to the drawings and particularly FIG. 1, there is illustrated a dynamometer apparatus for testing a 2 wheel drive ("2WD") vehicle 10 having front and rear wheels 12 and 14. The rear wheels (driven by the vehicle motor) are cradled between drive and idle rolls 16 and 18 in a conventional manner. Bearings 20 support both rolls on frame 22. A power supplying and absorbing unit 24 in the form of an electric motor (a.c. or d.c.) is coupled to the drive roll 16 through shaft 26, flexible coupling 28, mechanical flywheel 30, flexible couplings 32, torque transducer 34 and flexible coupling 36 as shown. Bearings 38 support the flywheel. A velocity encoder 40 is coupled to the drive roll shaft 26 for generating a velocity signal representative of the speed of the roll and the vehicle wheels in contact therewith. An idle roll 18 is coupled to the drive roll 16 via a clutched belt assembly 19. It should be noted that the fly-wheel is optional.

The rear vehicle wheels are raised above or lowered into the rolls by conventional means such as electrically actuated hydraulic lifts (not shown).

Signals from the torque transducer 34 and the velocity encoder 40 are supplied to a computer and system controller 42 which in turn supplies torque command signals to a power controller 44. The power controller in response to the torque command signal controls the motor 24 to supply power to or absorb power from the drive roll 16. For example, where d.c. motors are used, the power controller adjusts the armature current to cause the motor to drive or brake the drive roll. The computer 42 also controls conventional wheel lift and roll brake mechanisms through appropriate leads (not shown).

A keyboard 46 is connected to the computer 42 to allow an operator to input signals representative of the inertia and road load forces for the vehicle being tested. A video display and printer 48 allows the operator to display or printout test information in a conventional manner.

FIGS. 2a and b illustrate circuitry within the computer 42 which calculate the desired velocity (Vd) of the dynamometer roll (or rolls where 4WD vehicles are being tested) and utilizes that signal to provide a torque command signal $T_c$ which is supplied to the power controller 44.

A converter circuit 50 converts the measured torque signal T from the sensor 34 into a signal representative of the measured force signal Fm delivered to or received from the drive roll, by the vehicle wheels minus the associated parasitic losses and forces attributed to the inertia of (a) the out-of-loop dynamometer rotating components i.e., the rolls 16 and 18 and associated bearings and couplings and (b) the rotational components of the vehicle i.e., wheels and drive train.

A road load force calculating circuit 52 calculates the force (RL) attributable to the vehicle road load forces in accordance with the equation discussed previously, i.e., $RL = Av + BvV + CvV^2 + DW$ where V represents the speed of the roll 16 (or vehicles wheels), Av = vehicle constant load coefficient, Bv = vehicle load coefficient dependent on the velocity, Cv = vehicle load coefficient dependent on velocity squared, D = grade coefficient and W = vehicle weight.

A dynamometer parasitic loss signal generator 54 responds to the drive roll speed signal Vr and a dynamometer parasitic loss profile signal (stored in the computer) and generates a parasitic loss signal representative of the forces attributable to the dynamometer parasitic losses with or without the vehicle in place in accordance with:

ti $PL = Ad + BdV + CdV^2 + DdV^3$ where: Ad=dynamometer constant loss coefficient, Bd=dynamometer loss coefficient dependent on velocity, Cd=dynamometer loss coefficient dependent on velocity squared and Dd=dynamometer loss coefficient dependent on velocity cubed.

Each of the coefficients Ad, Bd, Cd and Dd will be at one value for the parasitic losses of the dynamometer (per se) when operated alone and at a greater value when the dynamometer is operated with a vehicle in place.

An acceleration signal selection circuit 56 receives a calculated acceleration signal Ac (to be explained) and a measured acceleration signal Am (i.e., dv/dt) and forwards the selected signal As in accordance with a preset ratio of vehicle inertia (Iv) to the out-of-loop mass inertia Io of the dynamometer and vehicle to a circuit 58. The out-of-loop inertia calculating circuit 58 also receives, as an input, a signal Io representing the out-of-loop inertia of the dynamometer and the vehicle. The output of the calculating circuit 58 is a signal IoAs representing the force attributable to the inertia of the out-of-loop dynamometer components (i.e., the roll set 16, 18 where the torque transducer is positioned as shown) and the vehicle rotating components (i.e., wheels and drive train).

An acceleration signal generating circuit 60 responds to a selected simulated inertia signal Iv for the vehicle and to RL, PL, Fm, and IoAs and calculates the desired acceleration, Ac, in accordance with:

$$Ac = \frac{Fm + PL + IoAs - RL}{Iv}$$

The calculated (or desired) acceleration signal Ac is outputted on lead 62 to an integrating circuit 64 which provides as an output the calculated or desired velocity signal Vd.

The measured acceleration signal (Am), inputted to selection circuit 56, is obtained by differentiating the measured roll velocity Vr. Preferably three historical values and a current value of the velocity are used via a conventional center of four value algorithm (i.e., using the slope of the line through the values) to provide the Am signal.

Under certain conditions, the availability of a measured as well as a calculated acceleration signal solves an inherent dynamometer stability problem. Use of the calculated acceleration signal Ac is preferred in most cases and offers optimum system response because calculated acceleration is not subject to system measurement time delays. However, in cases where the inertia (Iv) of the vehicle approaches the out-of-loop inertia of the dynamometer components and the vehicle, the dynamometer will become unstable when Ac is used to provide the IoAs signal.

This instability results when using the original control algorithm because the previous value of the calculated acceleration (Ac) is used in the calculation of the next value. In cases where the vehicle mass is greater than 2 times the out-of-loop mass, the out-of-loop inertia forces are a small part of the Ac value calculated. Under these conditions the control algorithm quickly converges on the correct Ac value. In cases where the vehicle mass is near the out-of-loop mass, the out-of-loop inertia forces are a large part of the Ac value calculated. Under these conditions the control algorithm is unstable. Any transient error in the Ac calculated becomes bigger because of the large contribution of the IoAc term.

For example, a dynamometer with a large roll or rolls (e.g., 48" in diameter) which engage the vehicle wheels, is limited in its ability to test vehicles of relatively light weight, e.g., of the order of 500 Kg, where the calculated acceleration signal Ac is used to calculate the out-of-loop inertial force signal IoAs. To remove this instability problem and allow vehicles having inertias (or weights) approaching or even less than out-of-loop inertia Io, the selector circuit 56 selects and forwards the measured acceleration signal Am to the calculating circuit 58 when Iv is within a predetermined range of Io e.g., 1.5 to 2. Preferably, Am or dv/dt is selected as As when Iv is equal to or less than 2Io and Ac is selected when Iv is more than 2Io.

The availability of the Am signal in addition to solving the stability problem discussed above allows the dynamometer designer to eliminate the flywheel by selecting the rotational mass of the roll or roll set to fall within the midpoint range of the inertias of the vehicles to be tested. As would be expected, the use of Am incurs one small penalty i.e., a slightly lower response time due to measurement delays.

The circuit for producing the torque command signal Tc for the power controller 44 is a conventional PID controller circuit and one such typical circuit is shown in FIG. 2b. A subtractor circuit 66 subtracts Vr (the achieved velocity) from Vd (the calculated or desired roll velocity) and produces a velocity error signal Ve. This error signal is supplied to a proportional circuit 68, an integrating circuit 70 and a differentiating circuit 72. A weighted summation circuit 74 provides a torque command signal in accordance with:

$$T_c = K_1 V_e + K_2 \int_0^t V_e dt + K_3 dV_e/dt$$

where $K_1$, $K_2$, and $K_3$ are constants.

Figure 3:
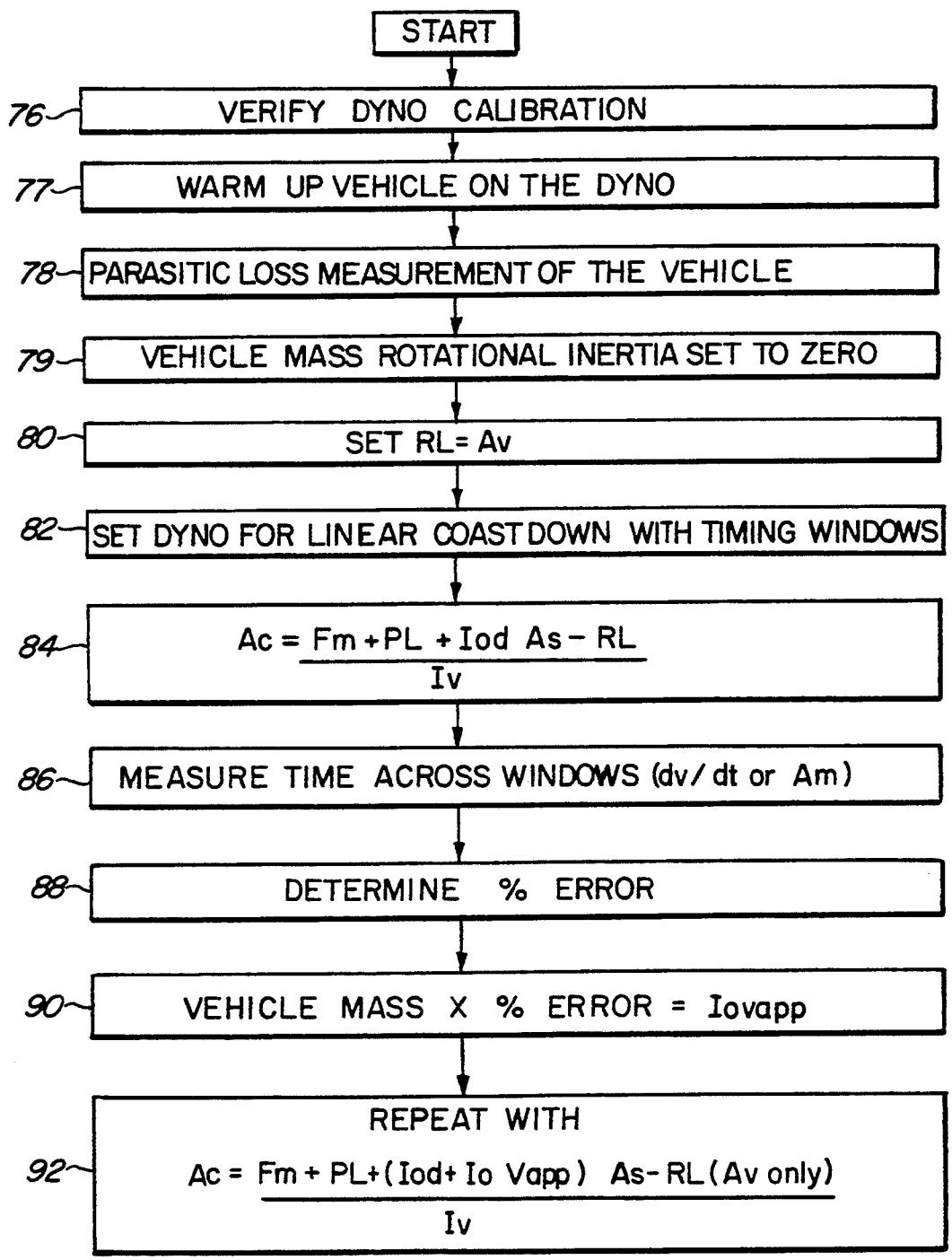
FIG. 3 is a flow chart illustrating a procedure for obtaining Iov.

The protocol for obtaining the out-of-loop inertia Iov (i.e., rotational mass of the vehicle) is illustrated in FIG. 3.

Initially the operator verifies that the dynamometer is accurately calibrated (step 76). The controller 42 is then operated at a set speed, per step 77, to warm up the vehicle wheels (tires) until the temperature is stable. The controller 42 is then configured to perform a parasitic loss measurement (vehicle and dynamometer losses), per step 78. A signal representative of the parasitic (i.e., out-of-loop) losses of both the dynamometer and vehicle is then stored and subsequently used as the dynamometer Pl signal in the control algorithm when testing a vehicle.

The vehicle's rotational mass is set to zero (step 79) if not already at such value in the computer 42 and the out-of-loop dynamometer inertia Iod is set to the value provided by the manufacturer. The road load term RL is set to equal the A term (i.e., a constant which is a function of the vehicle mass) per step 80.

The dynamometer controller is then set for a linear coastdown e.g., 1 Msec$^2$ from a preset speed, say 80 kilometers per hour (KPH), with timing windows, for example, at every 10 KPH. Block 84 illustrates the control algorithm used for the coastdown.

The coastdown time through each of the timing windows is then measured (step 86). Since the vehicle rotational mass has been set to zero, the coastdown times will be slightly longer than dictated by the predicted linear coastdown. The error in coastdown times (averaged) per step 88 is then multiplied by the vehicle weight to provide a value (Iovapp) in Kg or lbs approximating the vehicle rotational mass. This value of Iovapp is then added to the dynamometer out-of-loop inertia signal Iod in step 92. Steps 84–92 are then repeated until the error in the predicted deceleration is acceptably close to zero (block 92). The resulting value for Io is then stored in the computer 42.

It should be noted that a procedure similar to that shown in FIG. 3 may be used at the factory to determine the out-of-loop inertia of the dynamometer by itself with PL representing the parasitic losses of the dynamometer itself.

After Io has been determined as outlined above, the forces normally associated with actual vehicle operation will be simulated by the dynamometer in accordance with:

$$Vd = \int_0^t \frac{Fm + PL + IoAs - RL}{Iv} dt$$

where:
- Vd = the calculated velocity of the driven roll;
- Fm = the measured force signal;
- PL = the dynamometer parasitic loss signal;
- RL = the road load signal;
- Io = the out-of-loop inertia (i.e., Iod+Iov) signal;
- As = the selected vehicle acceleration signal (Ac or Am);
- Ac = the acceleration calculated;
- Am = the acceleration measured (i.e., dv/dt);
- dt = the interval of integration; and
- Iv = the simulated vehicle inertia signal.

There has been described an improved dynamometer apparatus and method for more accurately simulating the inertia and road load forces for motor vehicles. While the apparatus depicted in the drawings is set up for 2WD vehicles the invention is also applicable to 4WD vehicles as well as 2 wheel vehicles (i.e., motorcycles in which one or both wheels are driven). Where 4WD vehicles are to be tested with rolls or roll sets driven by both the front and rear vehicle wheels, the term F will equal the total of the force signals associated with the rolls being driven by the vehicle, PL will equal the total of the parasitic loss signals associated with each roll being driven by the vehicle and Iod will equal the total dynamometer out-of-loop inertia as will be apparent from U.S. Pat. No. 5,101,660, referred to previously.

It should be noted that the terms "driven roll or rolls" (or like terms) as used herein shall mean the roll or rolls which are driven by the vehicle at least during acceleration and constant speed operation. It is to be understood that such rolls will transfer power to (or drive) the vehicle wheels during braking and motor deceleration.

Various modifications of the apparatus or a variation in the method steps will occur to persons skilled in the art without departing from the spirit and scope of the invention as described in the appended claims.

What is claimed is:

1. A dynamometer apparatus for simulating the inertia and road load for motor vehicles having at least one front and one rear wheel with the front and/or rear wheels being driven, comprising:
   at least one roll for engaging the driven wheel of the vehicle;
   a power supplying and/or absorbing unit coupled to the driven roll, the unit being arranged to supply power to and/or absorb power from the roll, the driven roll applying a force to or receiving a force from the associated wheel in accordance with the supplied or absorbed power;
   force sensing means coupled to the driven roll, for providing a measured force signal Fm which is a function of the force supplied to or received from the vehicle wheel by the roll minus the force attributable to the parasitic losses associated with the roll and the inertia of the out-of-loop rotational components of the dynamometer and the vehicle;
   velocity sensing means coupled to the driven roll, for providing a measured speed signal Vr which is a function of the speed of the roll;
   means for generating a vehicle inertia signal Iv which is a function of the simulated inertia of the vehicle being tested;
   means for generating a road load signal RL which is a function of the road load forces for the vehicle;
   means for generating a dynamometer and vehicle parasitic loss signal PL which is a function of the force attributable to the parasitic losses of the dynamometer and vehicle;
   means for generating an out-of-loop inertia signal Io which is a function of the inertia attributable to the out-of-loop components of the dynamometer and the rotational mass of the vehicle;
   means for generating a vehicle acceleration signal As which is a function of the vehicle acceleration; and
   control means responsive to the velocity signal, the force signal, the parasitic loss signal, the inertia signal, the road load signal and the out-of-loop inertia signal for controlling the power supplying and/or absorbing unit in accordance with:

$$Vc = \int_0^t \frac{Fm + PL + IoAs - RL}{Iv} dt$$

where:
Vc = the calculated velocity of the driven roll; and
dt = the interval of integration.

2. The dynamometer apparatus of claim 1 wherein the control means includes means responsive to the calculated velocity signal and to measured speed signal for generating an error speed signal.

3. The dynamometer apparatus of claim 2 wherein the control means further includes means responsive to the error speed signal for controlling the power supplying and/or absorbing unit to reduce the associated error signal toward zero.

4. The dynamometer apparatus of claim 3 wherein the road load signal generating means is responsive to the measured speed signal of the driven roll and provides a road load signal in accordance with:

$$RL = Av + BvV + CvV^2 + DvW$$

where:
RL = the road load signal;

V = the measured speed signal; and
W = the vehicle weight; and
Av, Bv, Cv, and Dv are constants.

5. The dynamometer apparatus of claim 4 wherein the parasitic loss signal generating means in response to the measured speed signal provides a parasitic loss signal in accordance with:

$$PL = Ad + BdV + CdV^2 + DdV^3$$

where:
V = the measured speed signal; and
Ad, Bd, Cd and Dd are the dynamometer parasitic loss constants with the vehicle in place.

6. The dynamometer apparatus of claim 5 wherein the control means includes means for generating a calculated acceleration signal and wherein the As term is equal to the calculated acceleration signal.

7. The dynamometer apparatus of claim 5 including means for generating a measured acceleration signal and wherein As is equal to the measured acceleration signal.

8. The dynamometer apparatus of claim 5 further including means for generating a calculated acceleration signal Ac and a measured acceleration signal Am and selection means arranged to select Ac or Am as the As term.

9. The dynamometer apparatus of claim 8 wherein the selection means is arranged to select Ac as the As term when the vehicle inertia is outside of a predetermined range of the out-of-loop inertia of the dynamometer and the vehicle.

10. The dynamometer apparatus of claim 9 wherein the predetermined range is about twice the out-of-loop inertia.

11. The dynamometer apparatus of claim 9 wherein the selection means is arranged to select Am as the As term when the vehicle inertia is less than twice the out-of-loop inertia of the dynamometer and the vehicle.

12. The dynamometer apparatus of claim 9 wherein the power supplying and/or absorbing unit is an electric motor.

13. The dynamometer apparatus of claim 12 wherein said at least one front roll comprises a driven roll and an idler roll for cradling the driven wheels of the vehicle.

14. In a method for simulating the inertia and road load forces for motor vehicles on a chassis dynamometer installation, the dynamometer installation including at least one driven roll for engaging the driven wheels of the vehicle, at least one power supplying and/or absorbing unit connected to the driven roll, force sensing means for providing a measured force signal Fm representative of the force applied to or received from the vehicle wheels by the driven roll, minus the forces attributable to the parasitic losses associated with the dynamometer and vehicle plus the out-of-loop rotational components of the dynamometer and the vehicle; velocity sensing means for providing a velocity signal Vr representative of the speed of the roll; means for providing a roll acceleration signal As; inertia signal generating means for providing a signal Iv representative of the simulated inertia for the vehicle under test, road load signal generating means for providing a road load signal RL representative of the road load forces of the vehicle under test, parasitic loss signal generating means for providing a parasitic loss signal representative of the forces attributable to the parasitic losses of the dynamometer and vehicle, the method comprising:

a) placing the vehicle on the dynamometer so that the driven wheel(s) engage the driven roll;
b) operating the dynamometer with the vehicle in place to determine the out-of-loop inertial forces attributable to the out-of-loop rotational components of the dynamometer and the vehicle;
c) actuating the power supplying and/or absorbing unit coupled to the roll; and
d) controlling the power supplying and/or absorbing unit coupled to the roll to thereby control the speed of the roll or rolls in accordance with:

$$Vd = \int_o^t \frac{Fm + PL + IoAs - RL}{Iv} dt$$

where:
Vd = the desired velocity of the roll and vehicle wheel or wheels in contact therewith;
Fm = measured force signal;
PL = the dynamometer parasitic loss signal;
Io = the inertia signal representative of the out-of-loop rotational components of the dynamometer and the vehicle;
As = the roll acceleration signal;
RL = the road load signal;
dt = the interval of integration; and
Iv = the vehicle inertia signal.

15. The method of claim 14 further including the steps of obtaining a signal Ac which is representative of the calculated acceleration of the vehicle and a signal Am which is representative of the measured acceleration of the vehicle and the step of selecting one of said Ac and Am signals as the As signal.

16. The method of claim 14 wherein the selection step comprises selecting Ac as the As signal when Iv/Io is greater than a predetermined value and selecting Am as the As signal when Iv/Io is less than said predetermined value.

17. The method of claim 16 wherein said predetermined value is approximately 2.

18. The method of claim 14 wherein step (d) includes the steps of determining the difference between the desired velocity of the roll and the measured speed signal for the roll and for controlling the power supplying and/or absorbing unit to reduce said difference to a negligible value.

19. The method of claim 14 wherein step (b) comprises the following substeps:
1) accurately calibrating the dynamometer without a vehicle in place to determine the frictional parasitic losses of the dynamometer per se at steady state speeds;
2) performing a parasitic loss measurement of the dynamometer plus the vehicle;
3) storing the signal PL representative of said parasitic loss measurement;
4) setting the vehicle mass rotational inertia to zero;
5) obtaining a signal Iod representative of the out-of-loop inertia of the dynamometer;
6) controlling the power suppling and/or absorbing unit to provide a predetermined linear roll coastdown with the vehicle in place in accordance with:

$$Ac = \frac{Fm + PL + IodAs - RL}{Iv}$$

where:

RL = a constant which is a function of the vehicle mass;

7) controlling the power supplying and/or absorbing unit to bring the driven roll up to a preset speed and allowing the roll to coast down while measuring the deceleration at selected points;

8) determining the percentage error in the coastdown deceleration from the set coastdown value;

9) multiplying the percentage error by the weight of the vehicle to obtain a signal Iov representative of the inertia of the rotational mass of the vehicle; and 10) adding Iov to Iod to obtain Io (the out-of-loop inertia of the dynamometer and vehicle).

20. The method of claim 19 wherein the measurement of the deceleration rate in substep 7 is determined by measuring the time required for the roll to cross a predetermined number of discrete timing windows.

21. In a method for measuring the inertia of the rotational mass of a vehicle on a chassis dynamometer which includes at least one driven roll for engaging the driven wheels of the vehicle, at least one power supplying and/or absorbing unit connected to the driven roll, force sensing means for providing a measured force signal Fm representative of the force applied to or received from the vehicle wheels by the driven roll, minus the forces attributable to the parasitic losses associated with the dynamometer and vehicle plus the out-of-loop rotational components of the dynamometer and the vehicle; velocity sensing means for providing a velocity signal Vr representative of the speed of the roll; means for providing a roll acceleration signal As; inertia signal generating means for providing a signal Iv representative of the simulated inertia for the vehicle under test, the method comprising:

1) accurately calibrating the dynamometer without a vehicle in place to determine the frictional parasitic losses of the dynamometer per se at steady state speeds;

2) performing a parasitic loss measurement of the dynamometer plus the vehicle;

3) storing the signal PL representative of said parasitic loss measurement;

4) setting the vehicle mass rotational inertia to zero;

5) obtaining a signal Iod representative of the out-of-loop inertia of the dynamometer;

6) controlling the power suppling and/or absorbing unit to provide a predetermined linear roll coastdown with the vehicle in place in accordance with:

$$Ac = \frac{Fm + PL + IodAs - RL}{Iv}$$

RL = a constant which is a function of the vehicle where:

RL = a constant which is a function of the vehicle mass;

7) controlling the power supplying and/or absorbing unit to bring the driven roll up to a preset speed and allowing the roll to coast down while measuring the deceleration at selected points;

8) determining the percentage error in the coastdown deceleration from the set coastdown value;

9) multiplying the percentage error by the weight of the vehicle to obtain a signal Iov representative of the inertia of the rotational mass of the vehicle; and 10) adding Iov to Iod to obtain Io (the out-of-loop inertia of the dynamometer and vehicle).

* * * * *

UNITED STATES PATENT AND TRADEMARK OFFICE
CERTIFICATE OF CORRECTION

PATENT NO. : 5,375,460
DATED : December 27, 1994
INVENTOR(S) : John T. La Belle

It is certified that error appears in the above-identified patent and that said Letters Patent is hereby corrected as shown below:

Column 4, line 21, delete "fly-wheel" and insert --flywheel--.

Column 5, line 6, delete "ti".

Column 9, line 3, "By" should read --Bv--.

Column 12, lines 21-23 should read as follows:

--where:
  RL = a constant which is a function of the vehicle--

Signed and Sealed this

Second Day of May, 1995

Attest:

BRUCE LEHMAN

Attesting Officer     Commissioner of Patents and Trademarks